United States Patent
Neugart et al.

(12) 
(10) Patent No.: US 6,572,235 B1
(45) Date of Patent: Jun. 3, 2003

(54) ARRANGEMENT FOR ILLUMINATING A DISPLAY DEVICE WITH A DIAL

(75) Inventors: Elmar Neugart, Ladybrand (ZA); Eduard Krumm, Villingen-Schwenningen (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/717,699

(22) Filed: Nov. 20, 2000

(30) Foreign Application Priority Data

Dec. 1, 1999 (DE) .......................... 199 57 936

(51) Int. Cl.⁷ .............................................. G01D 11/28
(52) U.S. Cl. .......................................... 362/23; 362/30
(58) Field of Search ............................ 362/23, 24, 25, 362/28, 29, 30; 116/286, 310

(56) References Cited

U.S. PATENT DOCUMENTS 1,777,500 A * 10/1930 McLaughlin ................. 362/23
1,966,495 A * 7/1934 Fritts ........................... 362/24
2,902,970 A * 9/1959 Kadlec ......................... 362/23

FOREIGN PATENT DOCUMENTS

| DE | 19541886 | 5/1997 |
|---|---|---|
| EP | 0732679 | 9/1996 |
| JP | 08094394 | 4/1996 |
| JP | 09079872 | 3/1997 |

* cited by examiner

*Primary Examiner*—Y. My Quach-Lee
(74) *Attorney, Agent, or Firm*—Martin A. Farber

(57) ABSTRACT

For an arrangement for illuminating a display device with a dial 1, the rear side of the dial 1 being opaque over its entire surface area with the exception of a transmitted-light region 2 and this transmitted-light region 2 serving for the forming of a scale, there is on the rear side of the dial 1 a reflector shell 3, the shaping of which is such that the light radiated from a light-emitting diode 4 against a reflector wall 5 is diffusely distributed over the transmitted-light region 2 of the dial 1.

2 Claims, 3 Drawing Sheets

A-A

ARRANGEMENT FOR ILLUMINATING A DISPLAY DEVICE WITH A DIAL

FIELD AND BACKGROUND OF THE INVENTION

The invention concerns an arrangement for illuminating a display device with a dial and relates to display devices as are used in dashboards of motor vehicles.

Display devices of this type usually have a dial, the rear side of which is printed on in such a way as to be opaque over the entire surface area with the exception of a transmitted-light region, this transmitted-light region serving for the forming of a scale. In the case of a dial with a diameter of usually up to 110 mm, the transmitted-light region generally covers an angle of between 90° and 220°. To illuminate evenly a relatively large transmitted-light region of this type, usually a plurality of light sources arranged in an offset manner and radiating their light directly in the direction of the rear side of the dial are used. If only a single light source is used, it is assigned a solid light guide, which is arranged on the rear side of the dial and distributes the light of the light source over the transmitted-light region. Light-emitting diodes are increasingly being used nowadays as light sources.

This prior art has several disadvantages, however. With an increasing number of light sources used, the power loss increases, and consequently so too does the thermal heating. With an increasing number of light sources, the unit price of display devices of this type also increases, because additional electrical and electronic components such as resistors, shift registers etc. are required for the operation and control of each light source. A large number of components is also accompanied moreover by a higher probability of failure for the illuminating system as a whole. Configurations of illuminating arrangements with only one light source and an associated light guide are also relatively expensive, because tool costs, material costs and assembly costs for the light guide are incurred.

In addition, a considerable outlay has to be expended in the development and production process to establish for a conventional dial a half-tone overprint that ensures even illumination of the entire dial, since the printed result of the half-tone overprint is subject to wide variations in mass production, because certain process parameters such as the ink viscosity, soiling of the print screens and the printing tolerances can adversely influence the printed result to a considerable extent. If the process parameters mentioned are not subject to constant quality control, a uniformly high level of illuminating quality cannot be ensured for display devices of this type manufactured in mass production and provided with such dials, which is then directly reflected again in the acceptance of such display devices by customers.

SUMMARY OF THE INVENTION

It is thus the object of the present invention to present an arrangement for illuminating a display device with a dial in which the outlay for achieving an evenly illuminated dial is distinctly reduced.

The object is achieved by an for illuminating a display device with a dial having the features of the first claim. The dependent claims show refinements and developments of the solution found.

The solution is distinguished an arrangement for illuminating a display device with a dial, the rear side of the dial being opaque over its entire surface area with the exception of a transmitted-light region and this transmitted-light region serving for the forming of a scale, and wherein on the rear side of the dial there is arranged a reflector shell, the shaping of which is such that the light radiated from a light-emitting diode against a reflector wall is diffusely distributed over the transmitted-light region of the dial.

A structurally very advantageous solution for this arrangement is obtained if the reflector wall is arranged perpendicularly with respect to the dial and is formed by a wall of the reflector shell, the reflector wall being of a curved design in its contour extending in the plane of the dial and said reflector wall reflecting the light radiated from the light-emitting diode against a sector-shaped portion of the bottom of the reflector shell, this portion of the bottom being of a concave design, directed toward the dial, and the light being reflected to the transmitted-light region of the dial.

A particularly inexpensive solution is obtained if the reflector shell is produced in one piece from a light, plastic and the reflective shell is designed in its size and contour such that it essentially covers only the transmitted-light region of the dial.

One particular advantage of the solution found is that, instead of the half-tone overprint that is necessary in the case of conventional arrangements and is complex to achieve, and then only by several iteration steps, the dial need only have on the rear side a white solid-area overprint, which is easy to accomplish in technical printing-process-related terms.

In addition, it is also advantageous for the illuminating system as a whole that only a single light-emitting diode has to be arranged in the reflector shell for illuminating the transmitted-light region covering the entire scale. This measure noticeably simplifies the illuminating system as a whole. At the same time, the outlay for the development of a suitable geometry of the reflector shell used here is only slightly greater than in the case of conventional display devices of the generic type.

BRIEF DESCRIPTION OF THE DRAWINGS

The solution found is now to be explained in further detail on the basis of three figures, in which.

DETAILED DESCRIPTION OF THE PREFERRED EMBODIMENT

Figure 1:
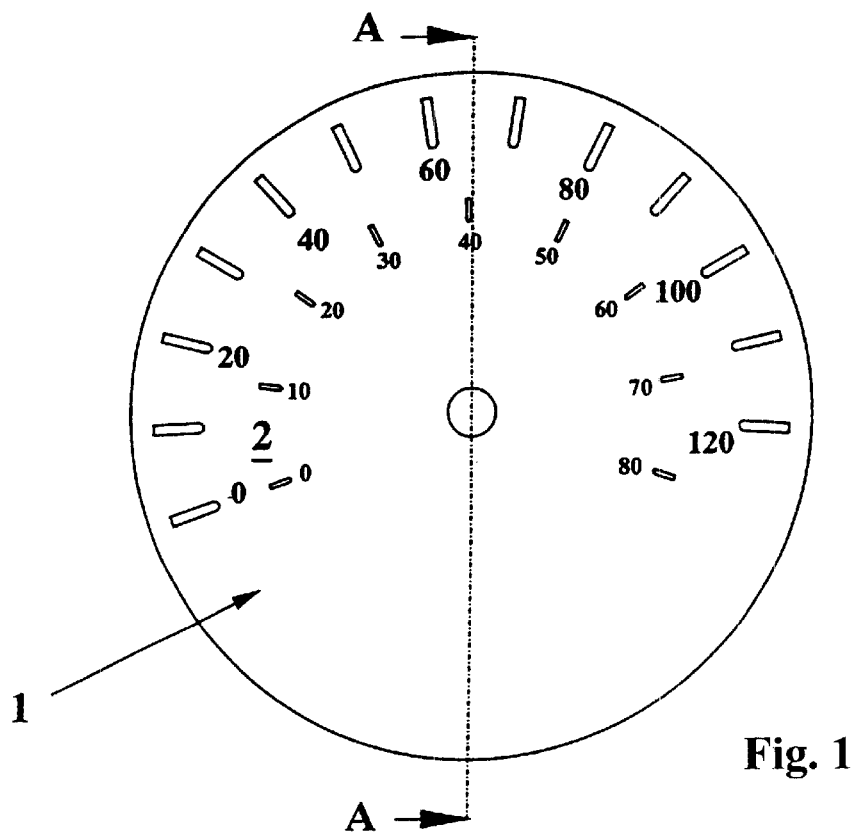
FIG. 1 shows a dial of a display device of the basic type in plan view.

FIG. 1 shows a dial 1 for a display device of the basic type in plan view. The dial 1 is represented here as a circular disk. Predominantly in the upper half, there are radial cutouts over an arc of approximately 220° along the circumferential line, forming the graduation marks of a scale. As shown in FIG. 1, often a double scale for different dimensional units of the measured variable to be indicated is also provided. At predominantly regular intervals, the graduation marks of the scale are assigned numbers, which quantify the deflection of a pointer. These numbers are also made in the dial 1 as light-transmitting cutouts. The remaining part of the dial 1 is opaque on account of being printed over the surface area of its rear side, preferably in white. The appearance of the front of the dial 1 can be made to be of any color desired by the customer. The cutouts for the graduation marks of the scale and the cutouts for the numbers, possibly supplemented by cutouts for indicating a dimensional unit for the measured variable, altogether form a transmitted-light region 2. The pointer passing over the dial 1 is not represented here, only the perforation point for the pointer spindle at the center of the dial 1. The section A—A indicated in FIG. 1 vertically through the display device of the basic type is represented in FIG. 2.

Figure 2:
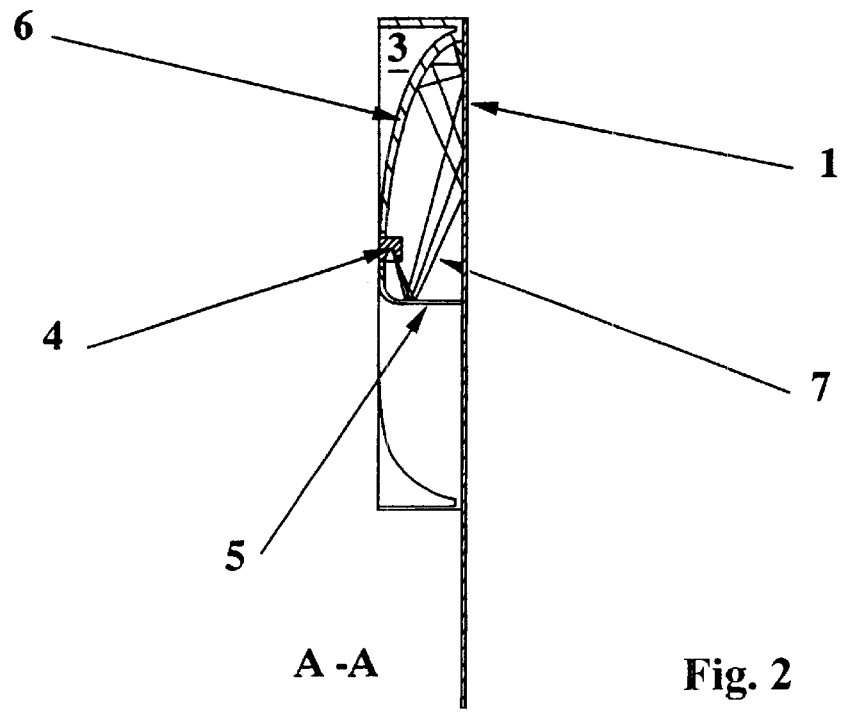
FIG. 2 shows a sectional representation of the arrangement found and FIG. 3 shows the inside view of the reflector shell.

FIG. 2 reveals that a reflector shell 3 is arranged flush against the rear side of the dial 1. For achieving the success aimed for by the invention, it is sufficient if the reflector shell 3 essentially covers only the transmitted-light region 2 of the dial 1. Coverage of the entire rear side of the dial 1 by the reflector shell 3 is not required, unless cutouts to be transilluminated are provided in a distributed manner over the entire surface area of the dial 1. A light-emitting diode 4 arranged in the reflector shell 3 radiates its light against a reflector wall 5, preferably arranged perpendicularly with respect to the dial 1. Beginning with this first reflection, the light radiated from the light-emitting diode 4 is scattered over the entire transmitted-light region 2 of the dial 1, as represented by way of example for some paths of rays 7, predominantly by multiple reflections at inner bounding surfaces of the reflector shell 3, in particular at its bottom 6 curved toward the rear side of the dial 1. The reflector shell 3 may advantageously be produced in one piece from plastic. The inner side of the reflector shell 3 is light, preferably white, and made to be reflective by a suitable surface finish, or it may be mirrored, for example by applying a glossy coating.

Figure 3:
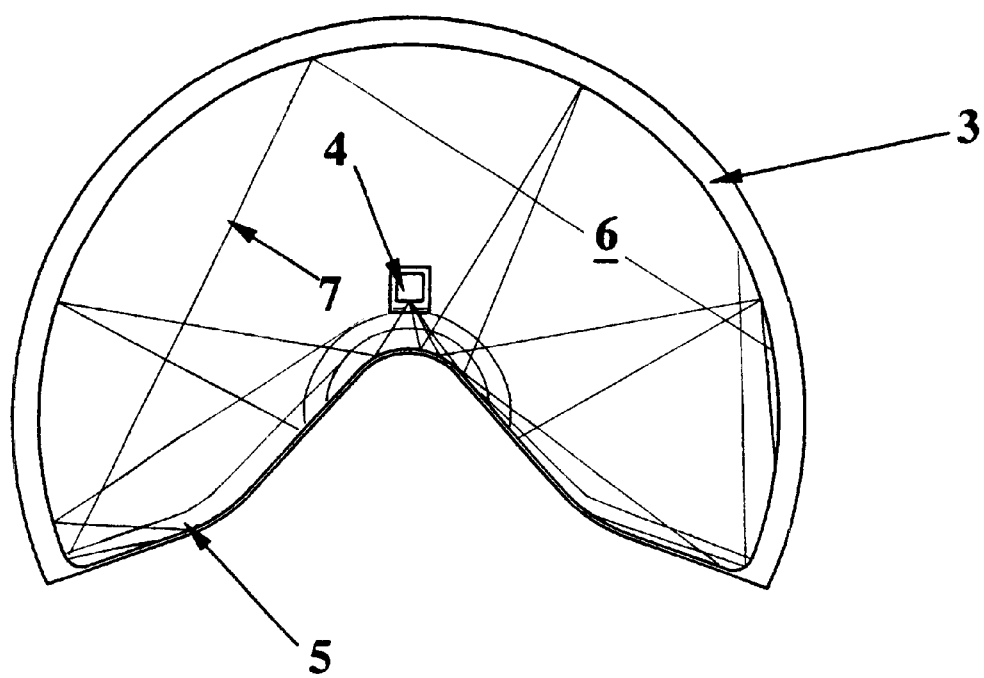

FIG. 3 then provides a view of the inside of the reflector shell 3. Here it can be seen that the reflector wall 5 is of a curved design in its contour extending in the plane of the dial 1, in order to reflect the light radiated from the light-emitting diode 4 in accordance with its radiating angle as completely and evenly as possible against the sector-shaped portion of the bottom 6 of the reflector shell 3, this portion of the bottom 6 being of a concave design in the direction of the dial 1, as FIG. 2 reveals, and reflecting the light toward: the transmitted-light region 2 of the dial. The basic mode of operation of this arrangement for illuminating a display device with a dial 1 is illustrated by several paths of rays 7 depicted by way of example.

Figure 4:
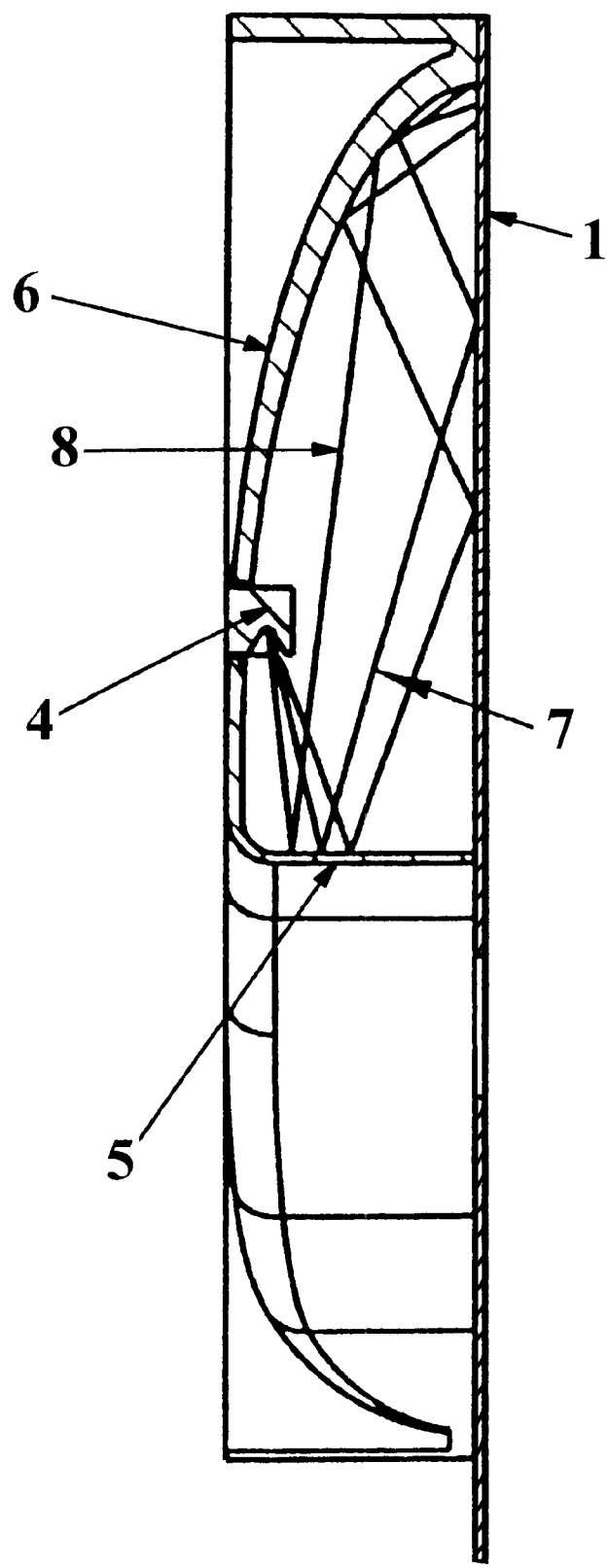
FIG. 4 shows a sectional representation of rays reflected off the reflector shell.

The arrangement found manages with a single light-emitting diode 4, which does not radiate its light directly against the rear side of the dial 1, but laterally into a reflector shell as can be seen in FIG. 4. By suitable shaping of the reflector shell 3, indirect illumination of the transmitted-light region 2 of the dial 1 can be achieved with a light intensity distributed virtually evenly over the entire transmitted-light region 2.

What is claimed is:

1. Arrangement for illuminating a display device with a dial, a rear side of the dial (1) being opaque over its entire surface area with exception of a transmitted-light region (2) and said transmitted-light region (2) serving for forming a scale, wherein on the rear side of the dial (1) there is a reflector shell (3), a shaping of which is such that light radiated from a light-emitting diode (4) against a reflector wall (5) is diffusely distributed over the transmitted-light region (2) of the dial, wherein the reflector wall (5) is arranged perpendicularly with respect to the dial (1) and is formed by a wall of the reflector shell (3), the reflector wall (5) being curved in its contour extending in a plane of the dial (1) and said reflector wall reflecting the light radiated from the light-emitting diode (4) against a sector-shaped portion of a bottom (6) of the reflector shell (3), said portion of the bottom (6) being concave, directed toward the dial (1), and reflecting the light to the transmitted-light region (2) of the dial (1).

2. Arrangement for illuminating a display device with a dial, a rear side of the dial (1) being opaque over its entire surface area with exception of a transmitted-light region (2) and said transmitted-light region (2) serving for forming a scale, wherein on the rear side of the dial (1) there is a reflector shell (3), a shaping of which is such that light radiated from a light-emitting diode (4) against a reflector wall (5) is diffusely distributed over the transmitted-light region (2) of the dial, wherein the reflector shell (3) is formed in its size and contour such that it essentially covers only the transmitted-light region (2) of the dial (1).

* * * * *